United States Patent
Yi et al.

(10) Patent No.: US 8,244,081 B2
(45) Date of Patent: Aug. 14, 2012

(54) PASSIVE ALIGNMENT USING ELASTIC AVERAGING IN OPTOELECTRONICS APPLICATIONS

(75) Inventors: Robert H. Yi, San Jose, CA (US); Brenton A. Baugh, Palo Alto, CA (US); James H. Williams, Walnut Creek, CA (US); Robert E. Wilson, Palo Alto, CA (US); Richard A. Ruh, Monte Soreno, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 78 days.

(21) Appl. No.: 12/813,334

(22) Filed: Jun. 10, 2010

(65) Prior Publication Data
US 2010/0247034 A1    Sep. 30, 2010

Related U.S. Application Data

(62) Division of application No. 12/248,102, filed on Oct. 9, 2008, now Pat. No. 7,764,853.

(51) Int. Cl.
G02B 6/12    (2006.01)
G02B 6/26    (2006.01)

(52) U.S. Cl. .......................... 385/14; 385/52
(58) Field of Classification Search .......... 385/14, 385/52
See application file for complete search history.

(56) References Cited

U.S. PATENT DOCUMENTS

| | | | | |
|---|---|---|---|---|
| 5,633,533 A | * | 5/1997 | Andros et al. | 257/707 |
| 5,691,041 A | * | 11/1997 | Frankeny et al. | 428/209 |
| 6,510,977 B1 | * | 1/2003 | Hertz | 228/246 |
| 6,635,866 B2 | | 10/2003 | Chan et al. | |
| 6,798,137 B2 | * | 9/2004 | Ishida | 313/512 |
| 6,910,812 B2 | * | 6/2005 | Pommer et al. | 385/92 |
| 7,027,478 B2 | * | 4/2006 | Ackley | 372/108 |
| 7,176,043 B2 | * | 2/2007 | Haba et al. | 438/14 |
| 7,241,643 B1 | * | 7/2007 | Kelkar et al. | 438/113 |
| 2002/0076919 A1 | * | 6/2002 | Peters et al. | 438/637 |
| 2002/0110335 A1 | * | 8/2002 | Wagner et al. | 385/89 |
| 2002/0123172 A1 | * | 9/2002 | Milla et al. | 438/108 |
| 2003/0007750 A1 | * | 1/2003 | Kryzak | 385/89 |
| 2003/0043360 A1 | * | 3/2003 | Farnworth | 355/77 |
| 2003/0095582 A1 | * | 5/2003 | Ackley | 372/108 |
| 2003/0111727 A1 | | 6/2003 | Kurusu | |
| 2003/0133668 A1 | * | 7/2003 | Wagner et al. | 385/65 |
| 2003/0160321 A1 | | 8/2003 | Cloud et al. | |

(Continued)

FOREIGN PATENT DOCUMENTS

JP    2002/076493    3/2002

(Continued)

OTHER PUBLICATIONS

Weber, Alexis C., "Precision Passive Alignment of Wafers", *Massachusetts Institute of Technology* Feb. 2002, 26, 27, 55, Fig. 5.5-5.8.

*Primary Examiner* — K. Cyrus Kianni

(57) ABSTRACT

In an optoelectronic assembly in which one or more beam paths are to be aligned with a corresponding number of active optical elements, the cooperation between flexible alignment features and fixed alignment features achieves elastic averaging so as to provide the target accuracy. By averaging dimensional and positional errors over a large number of localized couplings of the flexible and fixed alignment features, elastic averaging provides the same accuracy as the more costly and complex kinematic alignment techniques.

10 Claims, 4 Drawing Sheets

U.S. PATENT DOCUMENTS

| | | | |
|---|---|---|---|
| 2003/0201462 A1* | 10/2003 | Pommer et al. | 257/200 |
| 2004/0017977 A1* | 1/2004 | Lam et al. | 385/49 |
| 2004/0036170 A1* | 2/2004 | Lee et al. | 257/734 |
| 2004/0197045 A1 | 10/2004 | Lappohn | |
| 2005/0100264 A1* | 5/2005 | Kim et al. | 385/14 |
| 2005/0181544 A1* | 8/2005 | Haba et al. | 438/127 |
| 2006/0027899 A1* | 2/2006 | Humpston et al. | 257/668 |
| 2010/0247034 A1* | 9/2010 | Yi et al. | 385/14 |

FOREIGN PATENT DOCUMENTS

| | | |
|---|---|---|
| JP | 2004/191564 | 8/2004 |
| WO | WO-98/19194 | 5/1998 |

* cited by examiner

PASSIVE ALIGNMENT USING ELASTIC AVERAGING IN OPTOELECTRONICS APPLICATIONS

CROSS REFERENCE TO RELATED APPLICATIONS

This is a divisional application of copending application Ser. No. 12/248,102, filed on Oct. 9, 2008, which application was a divisional of application Ser. No. 10/994,764, filed on Nov. 22, 2004, which has issued as U.S. Pat. No. 7,454,105, the entire disclosures of which are incorporated herein by reference.

BACKGROUND ART

In optoelectronic applications, there is a conversion between an electrical mode and an optical mode of signal communication. In a conversion from the electrical mode, the electrical element is a light source, such as a Vertical Cavity Surface Emitting laser (VCSEL) or a Light Emitting Diode (LED). On the other hand, a conversion to the electrical mode utilizes a detector as the active optical element.

Optoelectronic modules are often used in coupling system components and to provide the mode conversion. The modules are designed to present a relatively small area along a surface of the module that receives optical fibers and to require a relatively small amount of real estate of a printed circuit board against which another surface of the module is seated. This allows a sequence of optoelectronic modules to be seated in a closely spaced arrangement for parallel handling of a large number of optical signals. Typically, each module includes an array of light sources or detectors and a corresponding number of light beams.

Within a single optical module, each beam may follow a direct path between the associated light detector/source and a lens at the input/output surface of the module. Alternatively, the beam paths may have ninety degree turns from the input/output surface to the light detectors or sources. A mirror or array of mirrors may be used to provide the light bending. Regardless of whether the optoelectronic module includes beam bending, the alignment process used in the fabrication of the module plays a key role in achieving the desired performance, yield and cost objectives. In general, the different alignment processes fall within three categories, namely active alignment, visual alignment, and passive alignment.

In an active alignment process, the light source is energized and the coupling between the light source and its intended target is monitored. Specifically, the magnitude of the output from the light source to the target is quantified as alignment adjustments occur. An optical fiber, lens, source, or some combination of components is positioned to achieve maximum coupling efficiency between the light source and its target. This process tends to be slow and relatively costly, because of the requirement of an effective closed loop control system. The system requirements include a set of actuators with sufficient mechanical resolution and stability, an effective peak search algorithm, and instrumentation to enable the monitoring of the coupling efficiency between the light source and its target.

The visual alignment process also functions as a closed loop system, but relies on visual cues (such as fiducials) or on the position of a light beam as monitored through an infrared camera. Thus, unlike the active alignment process, the magnitude of the output is not monitored. The primary drawbacks to visual alignment are that the capital equipment costs escalate rapidly with the required placement accuracy, and the throughput is often comparable to that of the active alignment process.

Passive alignment typically relies upon kinematics. Passive kinematic alignment can be described as alignment achieved by mating elements on the basis of accurately positioned physical features. For example, an optical fiber may be placed into a silicon submount having an etched V-shaped groove. The diameter of the optical fiber and the dimensions of the V-shaped groove are closely matched, enabling the desired positional control of the optical fiber. Other types of kinematic couplings include the use of holes, pins, and the like. The primary advantages of using passive alignment techniques are the reduction in the system investment and the general reduction in process complexity. The primary obstacle is that the inherent part costs quickly escalate as the required accuracy of part features increases. That is, the cost of a module increases as the positional tolerances of the kinematic alignment features become more demanding.

SUMMARY OF THE INVENTION

In an optoelectronic assembly in accordance with the invention, a coupler includes first and second coupling surfaces, with each surface having at least one beam port. The "beam ports" are defined as the opposite ends of beam path(s) through the coupler. The beam ports may or may not involve structural differences, such as lenses. For each beam path, there is a corresponding active optical element, typically a light source or a light detector. Each active optical element resides on a substrate. The cooperation of flexible alignment features and fixed alignment features achieves an elastic averaging alignment of each active optical element with its corresponding beam port of the coupler. By averaging dimensional and positional errors over a large number of local couplings, elastic averaging provides the same accuracy as a much more costly traditional kinematic alignment employing features which are dimensioned and positioned on the basis of exacting tolerances.

The coupling surfaces of the coupler may be parallel or may be perpendicular to each other. The substrate may be a printed circuit board or a ceramic, flex or semiconductor substrate. An advantage of the use of a semiconductor substrate is that integrated circuit fabrication techniques may be used to more precisely locate the alignment features which are used to achieve the elastic averaging alignment of the assembly parts.

The elastic averaging alignment may be realized using a number of different embodiments. The fixed alignment features may be on the substrate or on the coupler. In one embodiment, solder bumps are formed on the substrate. Because solder may be bumped and reflowed into a final shape, the inherent positional accuracy is dependent upon the selected method for defining the pads or conductive lines on which the solder is first deposited. The positional accuracy is also dependent upon the selection of the substrate, since pads may be formed more accurately on a semiconductor substrate than on a printed circuit board or a flex circuit. Pads on which the solder bumps are formed will have an excellent positional correlation to the fiducials that are required to die attach the active optical element (e.g., light source or light detector). After reflow, each solder bump will tend to center about its pad, as well as to achieve its lowest energy shape. Flexible alignment features may then be formed as part of the coupler. When the coupler is linked to the substrate, alignment is dependent primarily upon the positional accuracy and frequency of the solder bumps and secondarily upon the compliance of the flexible alignment features when contacting the fixed array of solder bumps.

In another embodiment, the compliance is built into the substrate by depositing the solder bumps onto flexible standoffs, such as polyimide members. In this embodiment, the fixed alignment features are features of the coupler. Rigid structural members of the coupler may be aligned with the standoffs to receive the solder bumps. As another alternative, the fixed array of features and the compliant array of features may take the form of holes and flexible pins. Holes may be etched or machined. A concern is that if the substrate is a printed circuit board, the typical approaches to forming holes may have inherent tolerances which are too relaxed to provide the desired coupler-to-substrate alignment.

As noted, semiconductor substrates, such as silicon, lend themselves well to elastic averaging, since it is relatively inexpensive and repeatable to achieve accurately positioned surface features. By etching the substrate or depositing layers on the substrate, the cost does not increase as the size of the optoelectronic assembly decreases. The flexible alignment features may be features of the coupler, while the fixed array may be formed by selectively etching the substrate to leave raised regions or by patterning layers atop the substrate.

DETAILED DESCRIPTION

It has been determined that elastic averaging provides an alignment technique which achieves a desired balance between performance objectives and cost restrictions. In fiber optic applications, alignment tolerances that were once in the tens of microns are currently five microns or less. This level is often beyond the capability of prior low-cost alignment technologies.

Elastic averaging alignment achieves the benefits of passive kinematic alignment (i.e., low cost, little or zero capital equipment required), while reducing much of the added component cost and manufacturability issues associated with high accuracy and precision. Traditional kinematic coupling requires strict control of six degrees of freedom (DOF) to position an object, and thus the alignment features must be positioned with tighter tolerances than the required alignment. While the technique is effective, it does not lend itself well to low-cost mass producible assemblies.

The kinematic alignment approach is to constrain the object with the minimum number of contact points necessary to adequately support the object. In comparison, elastic averaging "overconstrains" the supported object. With the present invention, it is possible to design assembly components such that the sum of weakly overconstraining features mimics an exact kinematic alignment.

In the elastic averaging embodiments that will be described below, several key design rules are addressed. Firstly, overconstrained couplings have no closed form solution, so that modeling or testing is required to verify the accuracy and precision. Secondly, elastic averaging couplings rely on averaging of contact points to aid in alleviating manufacturing tolerances in surface finish and feature shapes. Friction or simple contact-based designs are subject to variability in repeatability, as a result of wear and other factors. On the other hand, the compliant-based elastic averaging couplings of the present invention reduce the influence of wear on precision, but the range of motion should be limited. A third key design rule relates to the number of contact points. It is assumed that manufacturing errors are random, so that the theory of random errors dictates that the precision of elastic averaging coupling is proportional to the number of contact points. Thus, in each of the embodiments to be described, the number of alignment features in the fixed array of features should be adequate to ensure sufficient overconstraint. Preferably, the number of fixed alignment features is at least twenty. Yet another design rule addressed by the present invention is that true elastic coupling should allow for repeatability, as well as accuracy. This is important in applications in which rework, wear, and modularity are issues.

Figure 1:
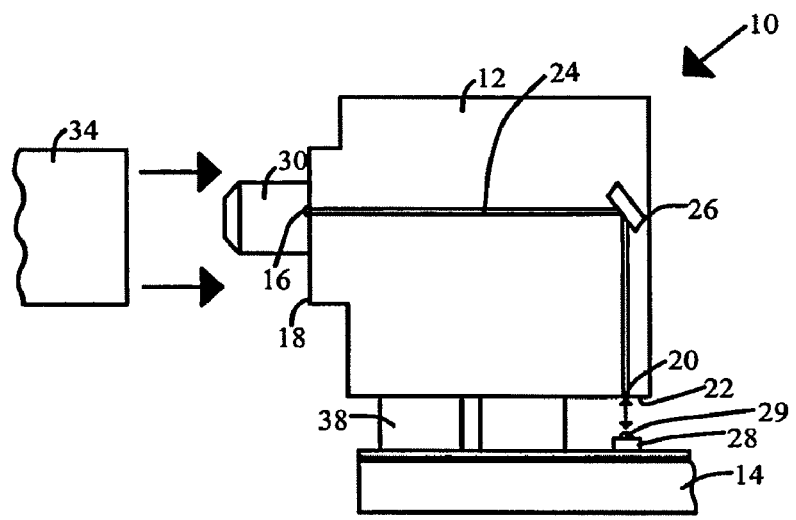
FIG. 1 is a side view of an optoelectronic assembly having components which are aligned on the basis of elastic averaging, in accordance with the present invention.

The elastic averaging alignment is well suited for connecting components of an optoelectronic module, so that the invention will be illustrated and described primarily with reference to such modules. However, other applications are contemplated. With reference to FIG. 1, an optoelectronic module 10 is shown as including a coupler block 12 and a substrate 14. In this embodiment, the coupler block may be referred to as a "lens element," since it includes a lens for each first beam port 16 on a first coupling surface 18. The coupling block also includes at least one second beam port 20 on a second coupling surface 22. Typically, there is an array of first beam ports and a corresponding array of second beam ports. Each beam port may be defined by a lens, but the "beam ports" are defined by beam paths and not necessarily physical changes along the surfaces. In the top view of FIG. 2, twelve lenses 16 are shown along the first coupling surface 18 of the coupler block 12. The number of lenses is not significant to the practice of the invention.

In FIG. 1, the coupler block 12 includes an optical turn, so that a beam path 24 connects each first beam port to its corresponding second beam port 20. A mirror 26 provides the bend. However, some optoelectronic modules are designed such that the first and second coupling surfaces are parallel, i.e., the beam paths are linear.

On the surface of the substrate 14 is an active optical element 28 that is aligned with the second beam port 20. A lens 29 resides on the active optical element. Depending upon the application, the active optical element may be a light source or a light detector. The number of active optical elements corresponds to the number of second beam ports. In practice, suitable light sources include LEDs, VCSELs, and photo diodes. Suitable detectors include PIN detection elements. The substrate 14 functions as a base for the coupler block 12 and is electrically functional to provide connections to bonding pads or other electrical circuitry on the substrate. The substrate may be a printed circuit board, a semiconductor substrate, a ceramic substrate, or a flex circuit. As is known in the art, a typical flex circuit includes one or more layers of conductive metal traces.

Figure 2:
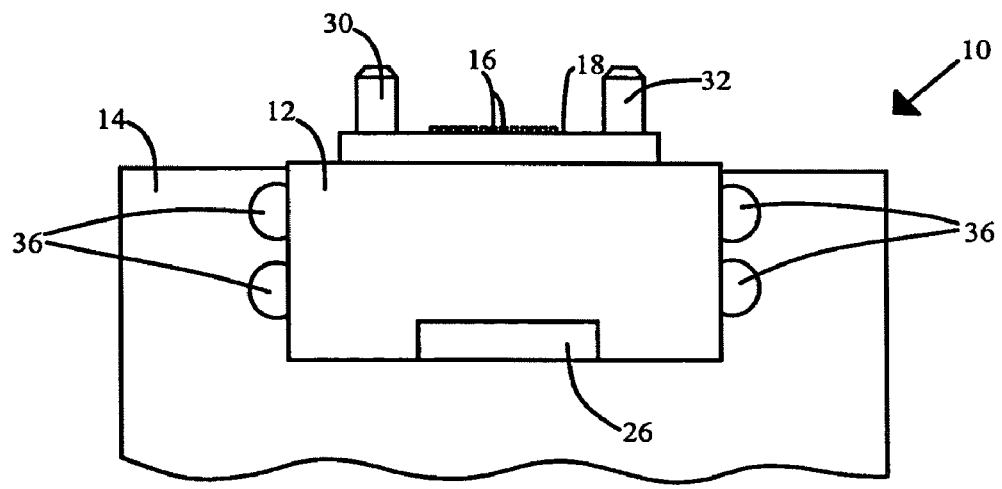
FIG. 2 is a top view of the optoelectronic assembly of FIG. 1.

Referring to FIGS. 1 and 2, projecting from the first coupling surface 18 is a pair of guidepins 30 and 32 for proper alignment with a plug-in device 34, such as a fiber optic connector. In the embodiment of FIGS. 1 and 2, the elastic averaging alignment arrangement for precisely locating the beam path or paths 24 relative to the active optical element or elements 28 includes fixed alignment solder bumps 36 on the substrate 14 and includes flexures 38 of the coupler block 12. The solder bumps 36 are referred to as "alignment" solder bumps, since they are included primarily or exclusively to achieve alignment and are typically electrically passive.

The solder bumps 36 provide an inexpensive, reliable surface feature for elastic averaging coupling. Because solder may be bumped and reflowed into a final shape, the inherent positional accuracy is equivalent to the selected method for depositing the conductive material on which the solder bumps are formed. For example, electrically isolated metallic pads may be patterned onto a printed circuit board, a flex circuit, or an equivalent electrically functional substrate. A key is that the pads on which the solder bumps rest will have excellent positional correlation to the fiducials required to die attach the active optical element 28. After solder reflow, each bump will tend to center about its pad and will achieve its lowest energy shape.

Elastic averaging using alignment solder bumps 36 is effective as a result of the diameter and shape variations of each bump, which are subject to influence from local fluctuations in flux, atmosphere, temperature, and composition. While a single solder bump can be subject to variations in diameter of up to 20 microns, it is possible to average this error by contact of the flexures 38 with a large number of solder bumps.

The flexures 38 of the coupler block 12 may be made of a compliant plastic. There are advantages to selecting a coupler block material that allows the main body to be unitary with the flexures. Thus, the material must be compliant and must be optically transparent if the beam paths 24 are to pass through the material. A well suited material is the amorphous thermoplastic polyetherimide sold by General Electric Company under the federally registered trademark ULTEM. However, other optically clear plastics such as acrylic and polycarbonate may also be used. Ultimately, the material selection will depend on the wavelength of light being manipulated, as well as the required process conditions.

Figure 3:
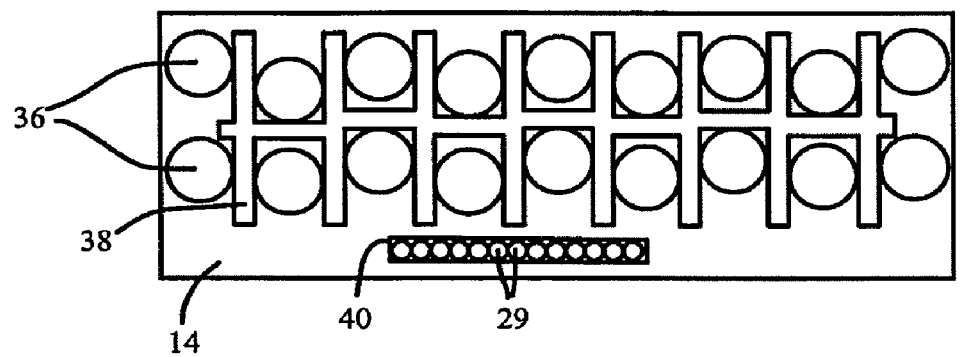
FIG. 3 is a top view of one embodiment of an elastic averaging alignment arrangement in accordance with the present invention.
Figure 4:
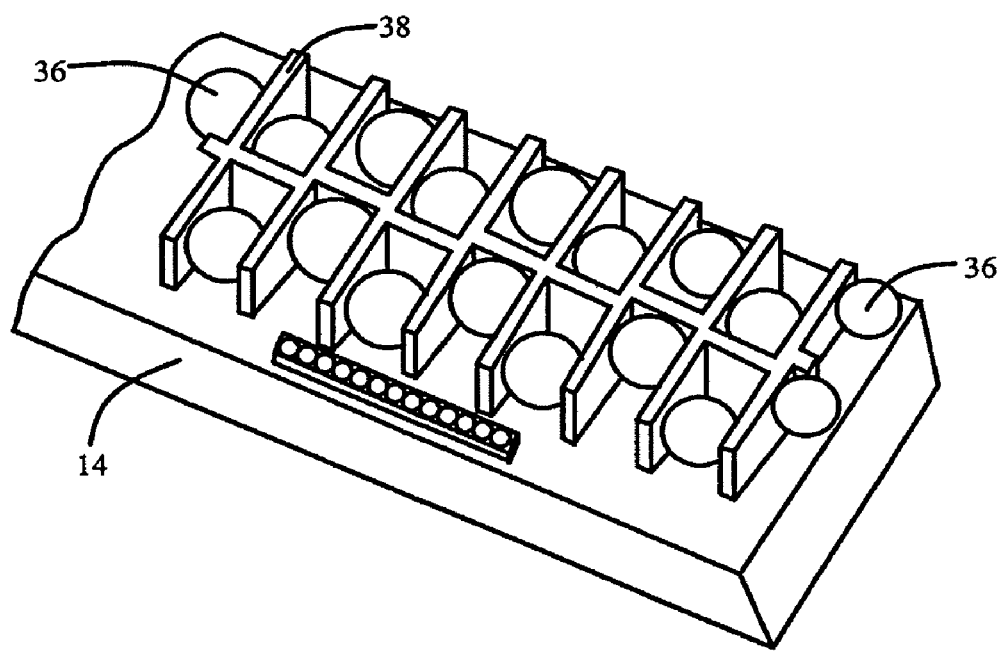
FIG. 4 is a perspective view of the elastic averaging alignment arrangement of FIG. 3.

As best seen in the top view of FIG. 3 and the perspective view of FIG. 4 (where the flexures 38 are shown removed from the main coupler block), the alignment solder bumps 36 are staggered and the crossbars of the flexures 38 have an alternating position with respect to distance from the longitudinal edges of the substrate 14. As a result of the geometries, the cooperation between the flexures 38 and the alignment solder bumps 36 achieves a reliable passive alignment from the lenses 16 on the first surface 18 of the coupler block 12 to the corresponding array of lenses 29 on the device 40 that defines the positions of the light source or detector. As is well known in the art, the twelve lenses 29 may correspond to a combination of light sources and light detectors. For example, half of the active optical elements may be light sources, while the other half may be PIN detectors.

Figure 5:
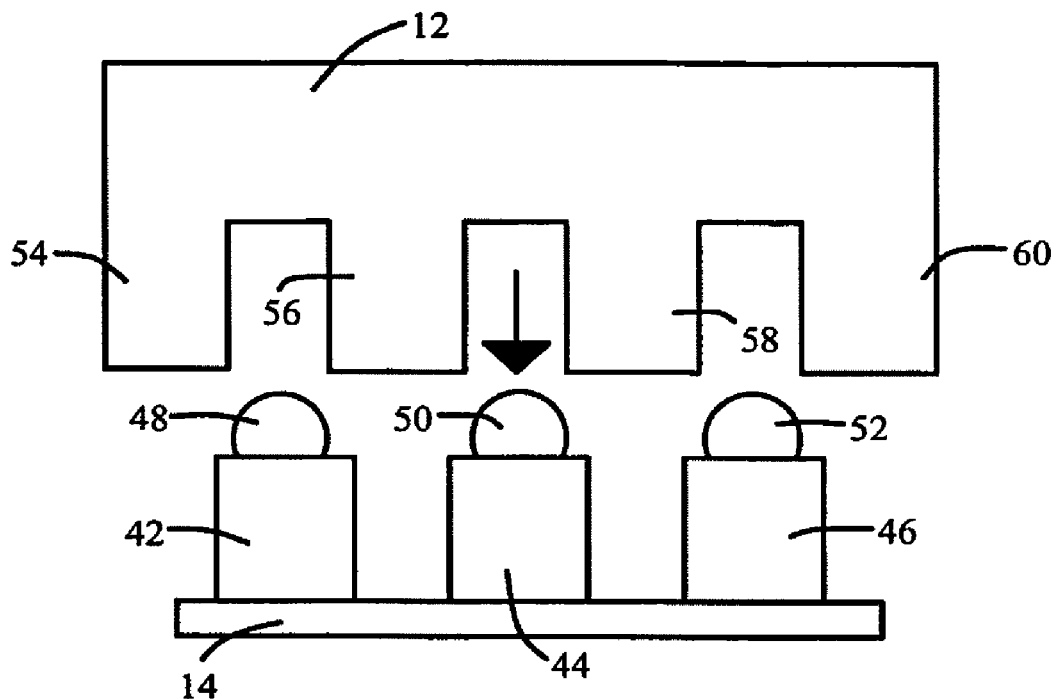
FIG. 5 is a schematic side view of a second embodiment of elastic averaging alignment in accordance with the invention.

FIG. 5 is a schematic view of a second embodiment of an elastic averaging alignment arrangement that uses both fixed alignment features and flexible alignment features. In this embodiment, the compliance is provided by standoffs 42, 44 and 46 that support solder bumps 48, 50 and 52 above the surface of the substrate 14. The standoffs may be made of polyimide or a similar material having compliancy. The fixed alignment features are downwardly depending regions 54, 56, 58 and 60 of the coupler block 12. In linking the coupler block to the substrate, the spaces between the downwardly depending regions are aligned with the solder bumps. Because the solder bumps are supported by compliant columns (standoffs), the inexactness of positional tolerances in fabricating the coupler block and the standoffs will not prevent seating of the coupler block. By providing sufficient overconstraint, the composite error is well within acceptable limits. Preferably, there are at least twenty standoffs.

Figure 6:
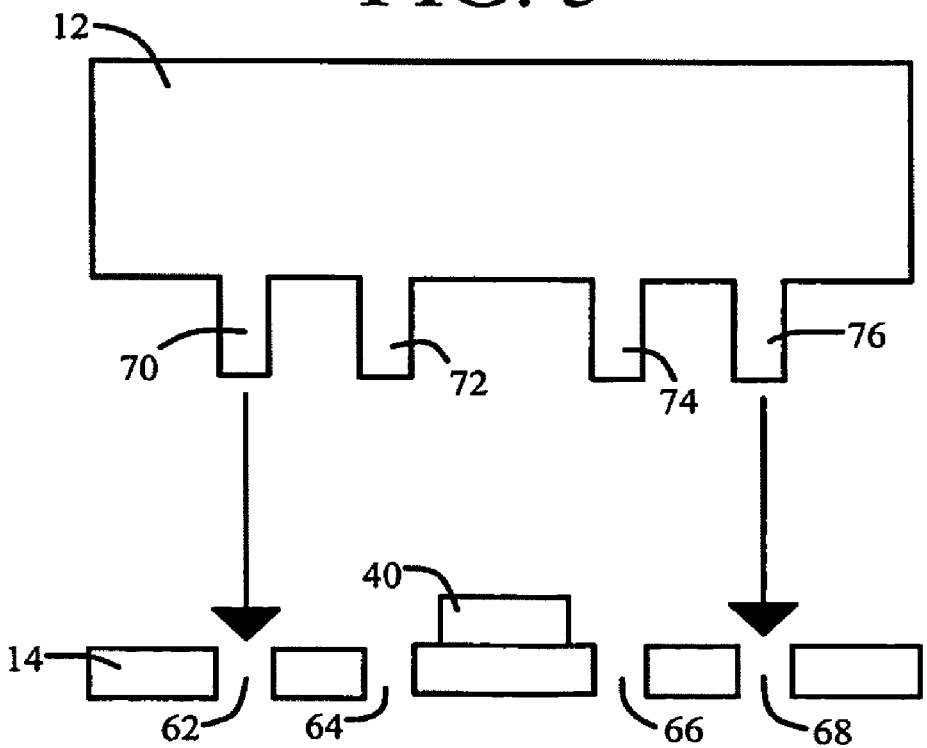
FIG. 6 is a schematic side view of a third embodiment of elastic averaging alignment in accordance with the invention.

FIG. 6 is a representation of a third embodiment of the invention. Within the substrate 14, openings 62, 64, 66 and 68 are formed in positions to receive compliant protrusions 70, 72, 74 and 76 extending from the coupler block 12. This embodiment is less suited for applications in which the substrate is a printed circuit board, since typical hole tolerances for printed circuit boards are too inexact for all but the least demanding alignments. However, the application is well suited for use with flex substrates, ceramic substrates, and particularly semiconductor substrates. When the compliant protrusions are inserted into the substrate openings, the beam ports along a surface of the coupler block are properly aligned with the lenses/active optical elements of the device 40. Alternatively, the compliant protrusions may be formed along the substrate 14, while the openings are formed within the coupler block 12.

Figure 7:
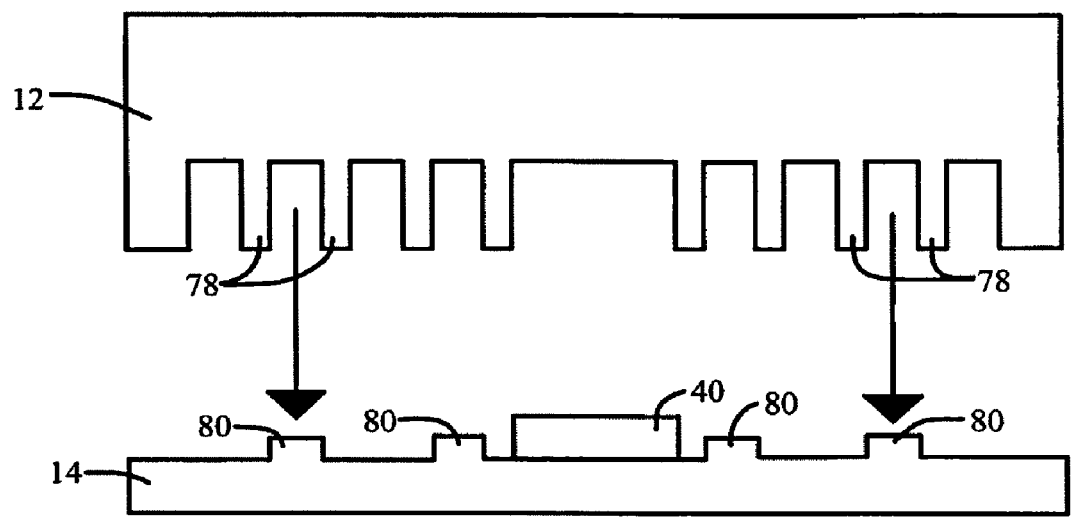
FIG. 7 is a schematic side view of a fourth embodiment of elastic averaging alignment in accordance with the invention.

The uses of semiconductor substrates lend themselves particularly well to elastic averaging coupling, because it is relatively easy and inexpensive to achieve accurately etched features, even as the size of the components of the assembly decreases. In the embodiment of FIG. 7, downwardly depending flexures on the coupler block 12 compliantly align themselves to etched posts 80 on the substrate 14. Techniques for etching back the substrate material are well known in the art.

Figure 8:
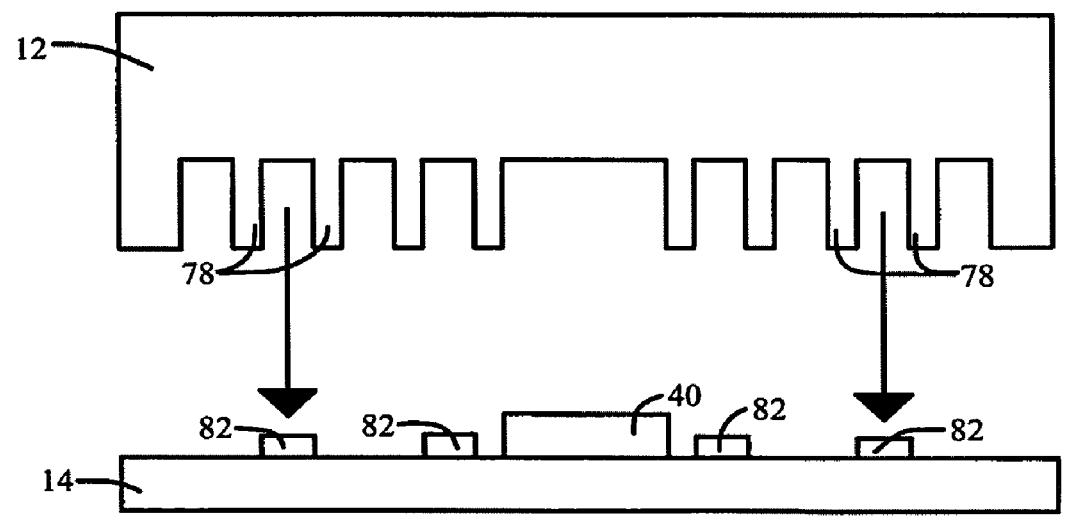
FIG. 8 is a schematic side view of a fifth embodiment of elastic averaging alignment in accordance with the invention.

FIG. 8 is a variation of the embodiment of FIG. 7. Rather than etching the semiconductor substrate directly, patterned material is provided on the substrate 14 to form posts 82. Techniques are known for either depositing the post material in the desired pattern or blanket depositing the material for patterning.

While a variety of embodiments have been illustrated and described, the description is not exhaustive. Other elastic averaging alignment arrangements are contemplated. The specific techniques must be justified based on the required performances and cost restrictions. As a general rule, elastic averaging can achieve the same accuracy as a much more costly traditional kinematic alignment approach, since dimensional and positional errors are averaged over a large number of weakly overconstrained couplings. Significantly, elastic averaging coupling allows for the relaxation of tolerances in both the manufacture and placement processes.

What is claimed is:
1. An optoelectronic assembly comprising:
a coupler having first and second coupling surfaces, said first surface having a first beam port and said second surface having a second beam port, said coupler defining a beam path between said first and second beam ports;
a substrate having an active optical element, wherein said active optical element is one of a light source and a light detector, said first coupling surface being substantially perpendicular to said second coupling surface; and
an elastic averaging alignment arrangement for precisely locating said second beam port of said coupler relative to said active optical element, said elastic averaging alignment arrangement including an array of fixed alignment features on one of said coupler and substrate and including a plurality of flexible alignment features on the other of said coupler and substrate, said fixed alignment fea- tures being dedicated to achieving elastic averaging by cooperation with said flexible alignment features.

2. The optoelectronic assembly of claim 1, wherein said first coupling surface includes an array of said first beam ports and said second coupling surface includes an array of said second beam ports, each said first beam port being optically associated with one of said second beam ports by a beam path and being precisely located with respect to a particular active optical element by said elastic averaging alignment arrangement.

3. The optoelectronic assembly of claim 1 wherein said fixed alignment features are solder bumps that are inactive with respect to conduction of signals.

4. The optoelectronic assembly of claim 3 wherein said flexible alignment features are flexures having a combined configuration based upon a combined configuration of said solder bumps that form said array of fixed alignment features.

5. The optoelectronic assembly of claim 4 wherein said combined configuration of flexures forms spaces dimensioned such that individual said solder bumps have opposite sides contacted by adjacent said flexures.

6. The optoelectronic assembly of claim 5 wherein said flexures include first flexures that extend in a direction perpendicular to second flexures.

7. The optoelectronic assembly of claim 1 wherein said flexible alignment features include flexible standoffs and wherein said fixed alignment features define cavities having a configuration corresponding to said flexible standoffs.

8. The optoelectronic assembly of claim 7 wherein said standoff supports a solder bump, said cavities being dimensioned to receive said solder bumps.

9. The optoelectronic assembly of claim 1 wherein said fixed alignment features include openings in said substrate, said fixed alignment features including flexible projections that are geometrically configured to extend into said openings.

10. The optoelectronic assembly of claim 1 wherein said substrate is a semiconductor substrate and said fixed alignment features are defined on said semiconductor substrate by integrated circuit techniques, said coupler having said flexible alignment features.

* * * * *